United States Patent [19]

Spurlin et al.

[11] 4,007,825

[45] Feb. 15, 1977

[54] VIBRATORY PARTS FEEDER DRIVEN BY ROTATING ECCENTRIC WEIGHTS

[75] Inventors: William V. Spurlin, Indiana, Pa.; Patrick J. Carroll, Upland, Calif.

[73] Assignee: FMC Corporation, San Jose, Calif.

[22] Filed: Aug. 5, 1975

[21] Appl. No.: 602,060

[52] U.S. Cl. ............................. 198/770
[51] Int. Cl.[2] .......................... B65G 27/00
[58] Field of Search ........... 198/220 BC, 220 CA, 198/220 DB; 74/22 A, 25, 61; 248/15, 20, 21, 22

[56] References Cited

UNITED STATES PATENTS

| | | | |
|---|---|---|---|
| 1,798,846 | 3/1931 | Kennedy | 248/20 |
| 1,833,755 | 11/1931 | Panoff | 248/26 |
| 1,879,458 | 9/1932 | Peltier | 248/26 |
| 1,976,897 | 10/1934 | Sievert et al. | 248/16 |
| 2,418,982 | 4/1947 | O'Connor | 259/72 |
| 2,827,157 | 3/1958 | Tsuchiya et al. | 198/220 DB |
| 2,972,197 | 2/1961 | Mickus et al. | 198/220 BC |
| 3,012,654 | 12/1961 | Allen et al. | 198/220 DA |
| 3,040,591 | 6/1962 | Peregrine et al. | 74/61 |
| 3,053,379 | 9/1962 | Roder et al. | 198/220 DB |
| 3,176,834 | 4/1965 | Allen et al. | 198/220 DB |
| 3,258,111 | 6/1966 | Spurlin et al. | 198/220 BC |
| 3,295,808 | 1/1967 | Webb | 248/178 |
| 3,407,670 | 10/1968 | Venanzetti | 198/220 DB |
| 3,509,391 | 4/1970 | Pfeuffer | 248/17 |
| 3,546,925 | 12/1970 | Barton | 248/20 |
| 3,915,292 | 10/1975 | Brown | 198/220 CA |

FOREIGN PATENTS OR APPLICATIONS 838,072  6/1960  United Kingdom ......... 198/220 DB Primary Examiner—Evon C. Blunk
Assistant Examiner—Joseph E. Valenza
Attorney, Agent, or Firm—J. F. Verhoeven; J. W. Edwards; C. E. Tripp

[57] ABSTRACT

A vibratory parts feeder has a feeder bowl with a helical track originating at the bottom of the bowl and extending upwardly along the inner periphery of the bowl wall to an exit station at the top of the bowl. Articles can be progressively fed from the lower portion of the bowl along the helical track to the exit station at a given feed rate by vibratory energy. The feeder bowl and its mounting frame form a feeder bowl mass that is supported above a base mass by a plurality of inclined leaf springs. One end of each spring is connected to the feeder bowl mass and an opposite end of the spring is connected to the base mass. The leaf springs are arranged to move one of the masses vertically in response to rotational twisting of one of the masses relative to the other mass about a central vertical axis of the feeder. A driver that is mounted on one of the masses has a plurality of rotating eccentric weights for imparting to the mass upon which the driver is mounted an oscillating rotational impulses about the central vertical axis of the feeder. These impulses cause the feeder bowl mass to rotationally oscillate about the central vertical axis and to move up and down at accelerations which permit the helical track within the feeder bowl to lose contact on a downstroke with articles being fed along the track. When contact between the track and the articles being fed is resumed on an upstroke, the articles are located in advanced positions along the track due to rotational oscillation of the feeder bowl mass.

11 Claims, 14 Drawing Figures

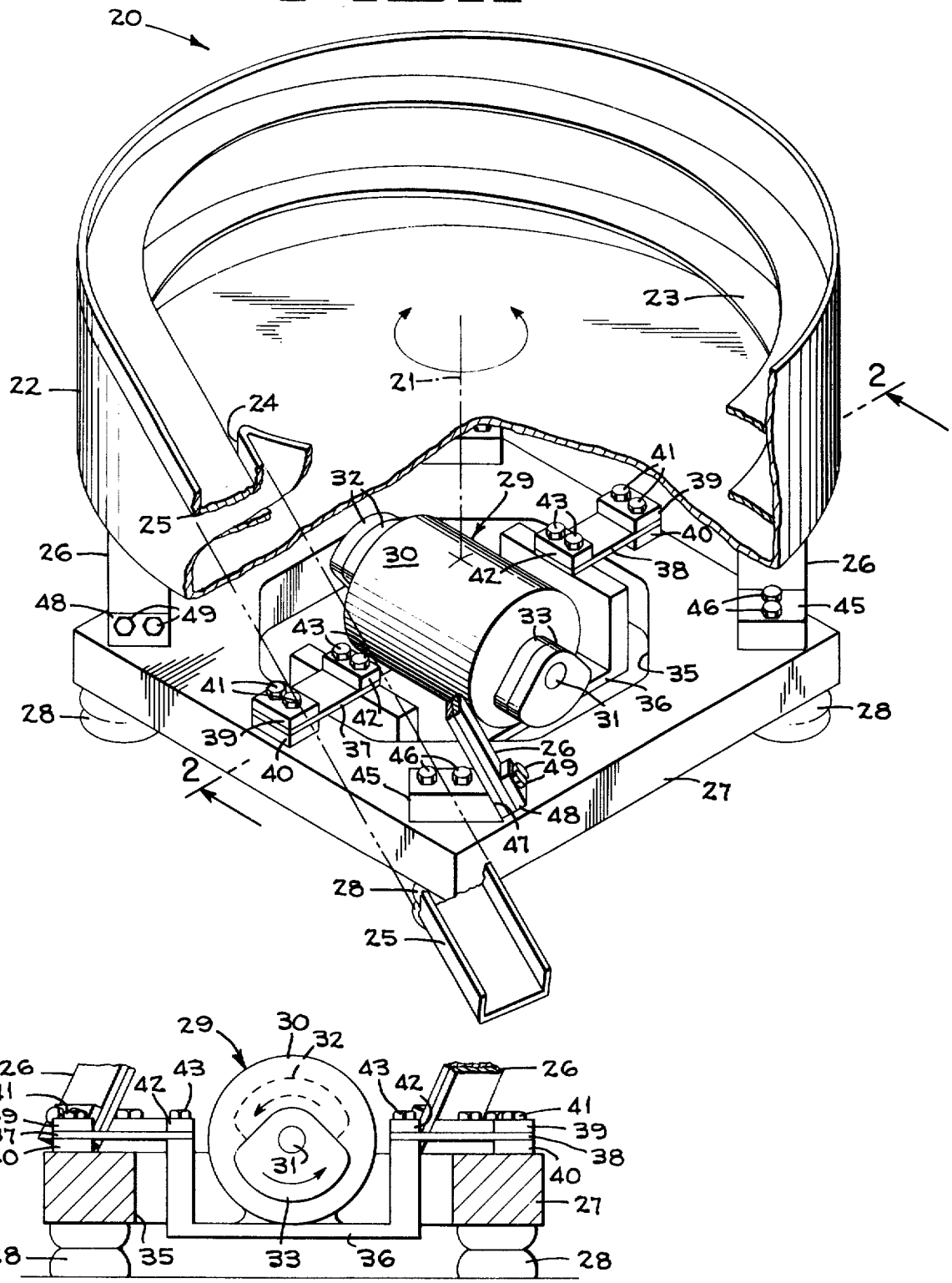

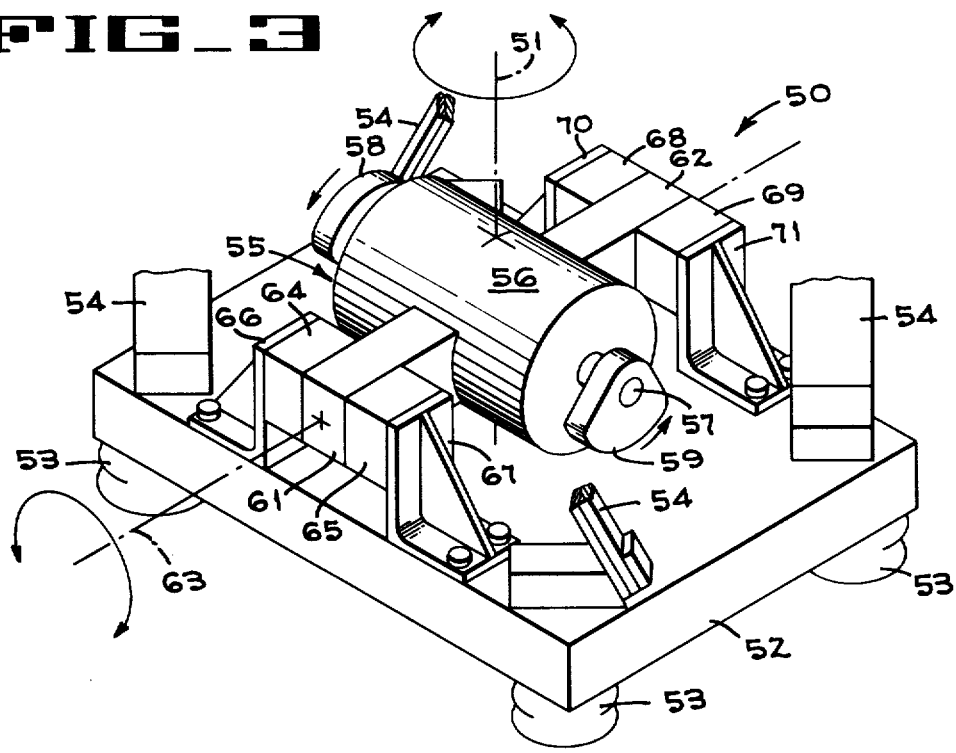
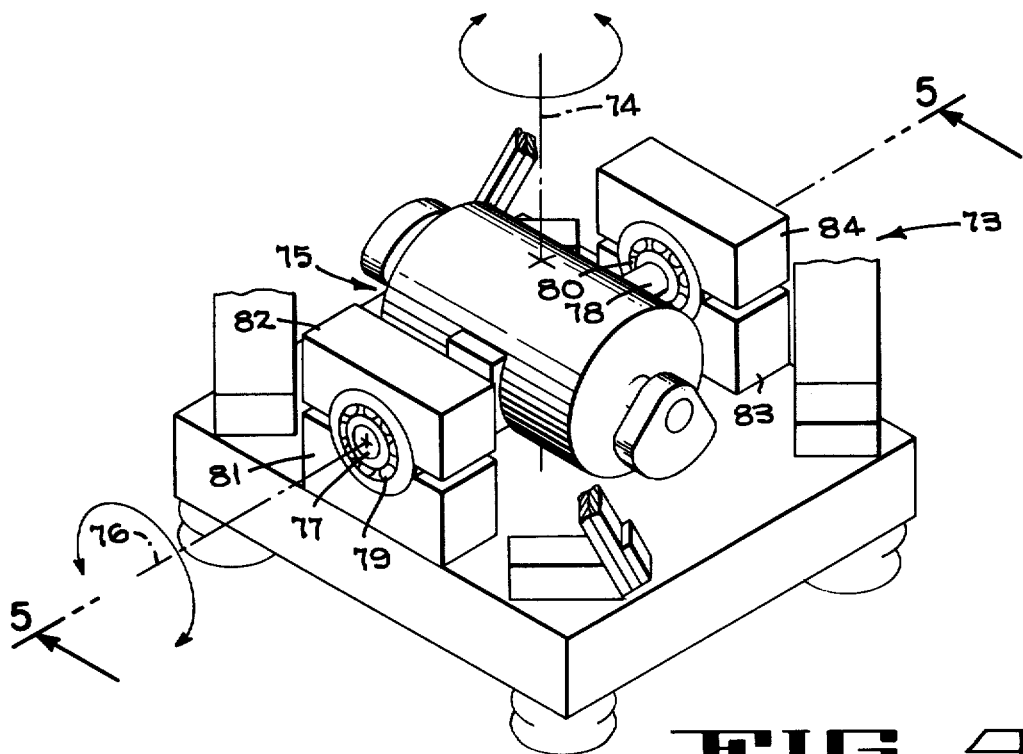

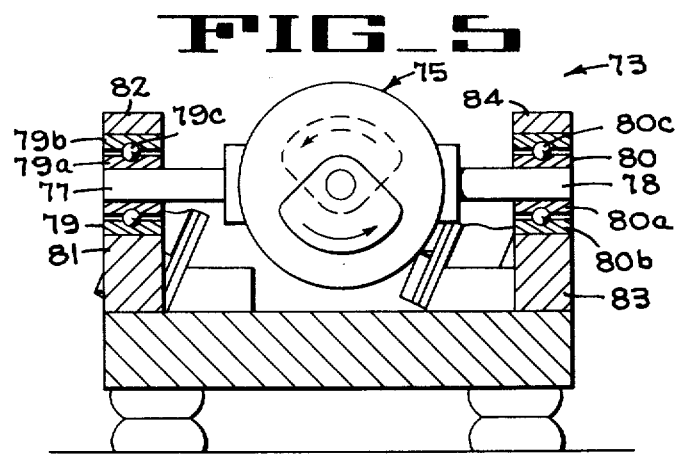
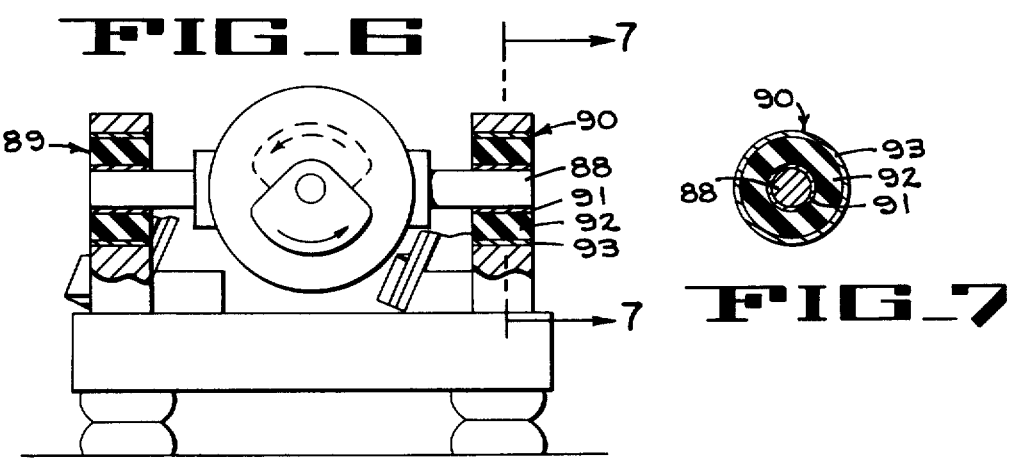
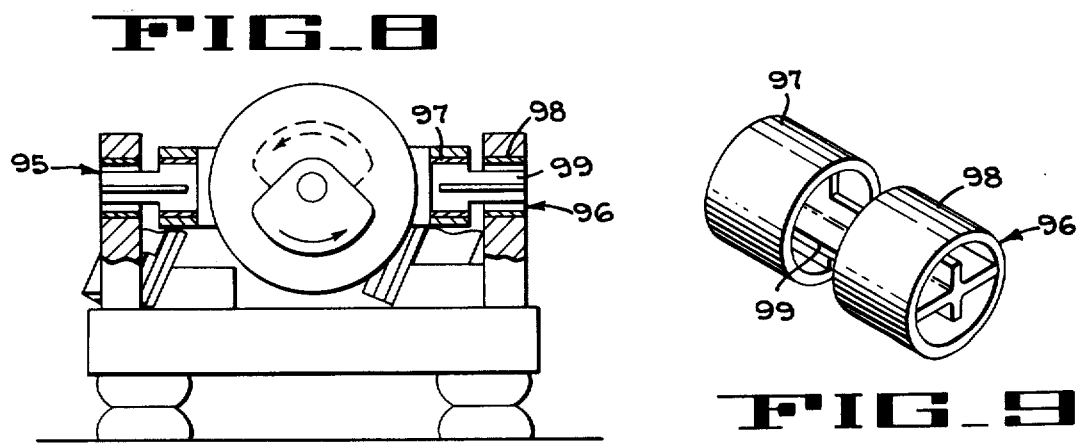

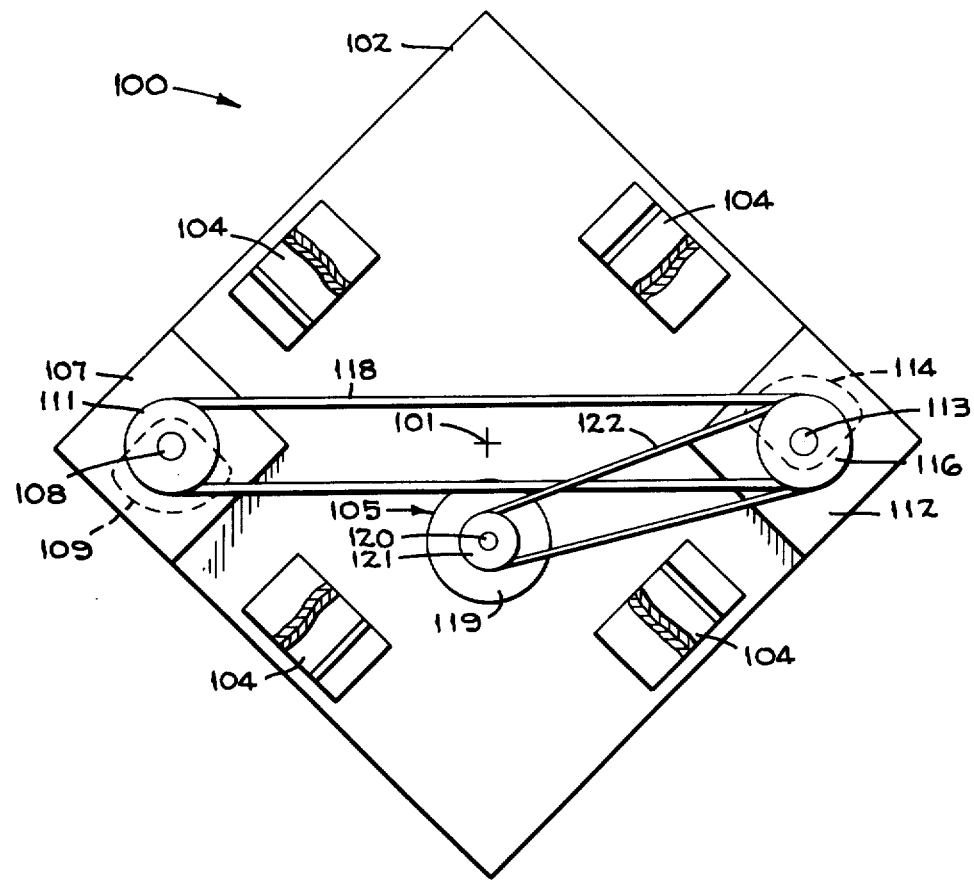
FIG_10
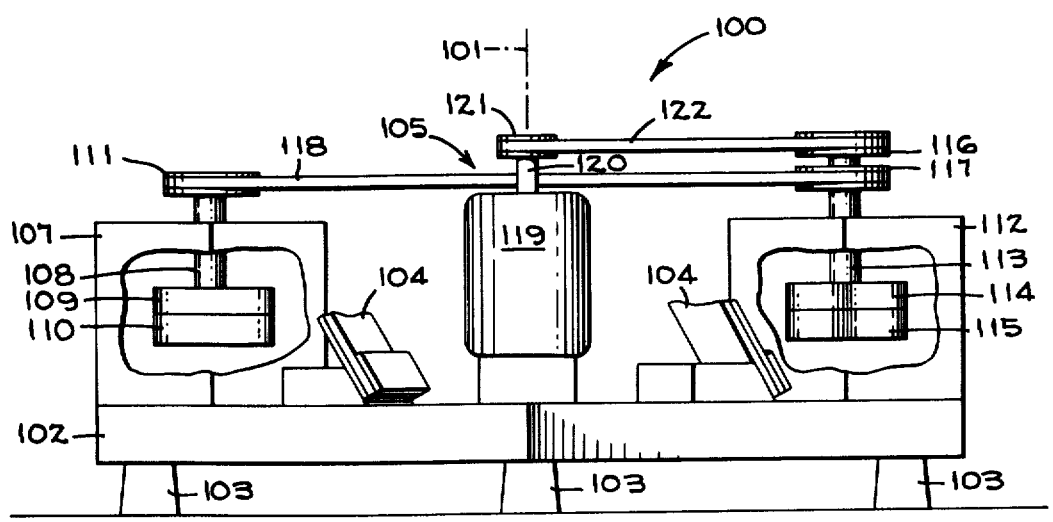
FIG_11

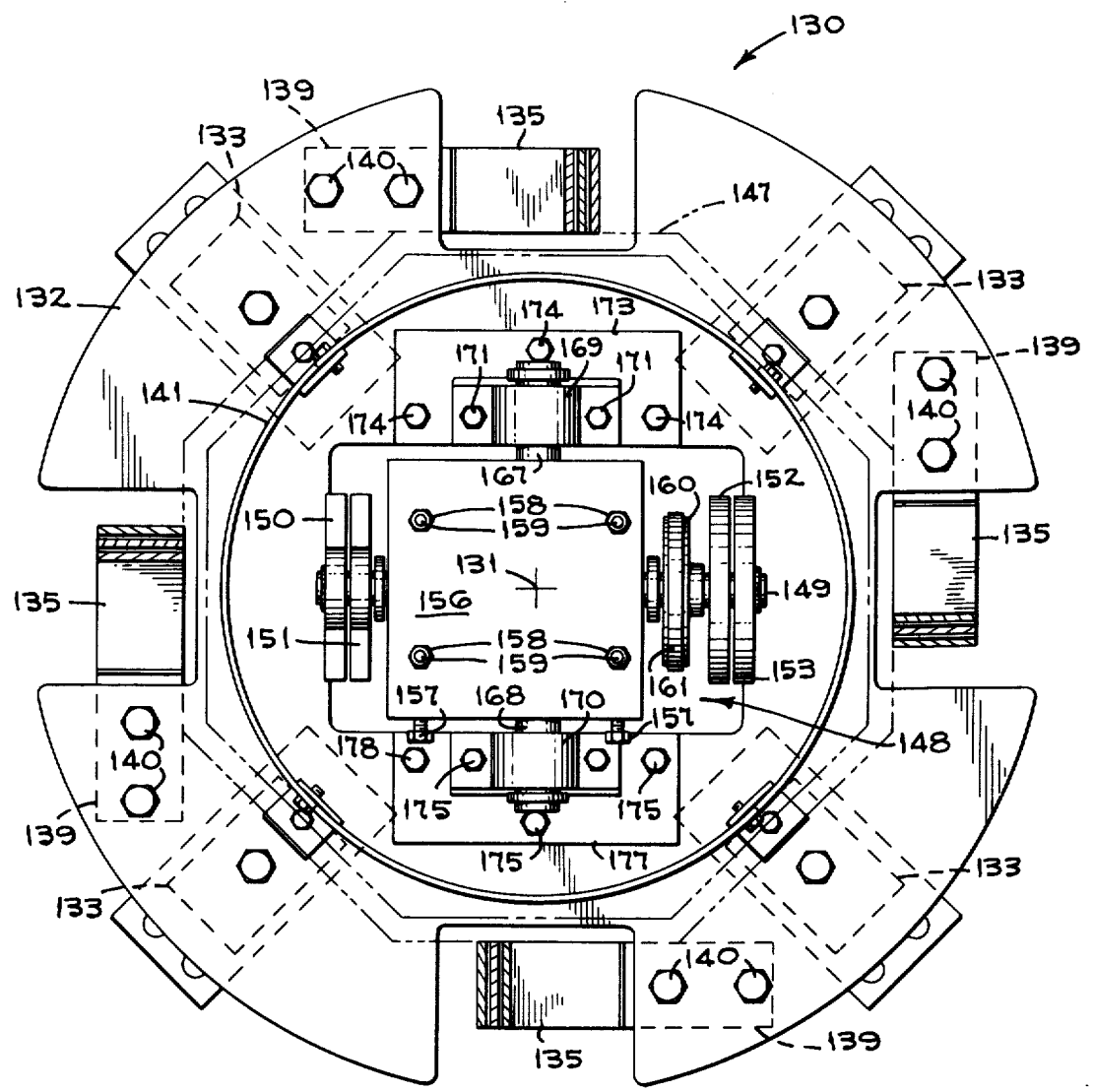
FIG_12

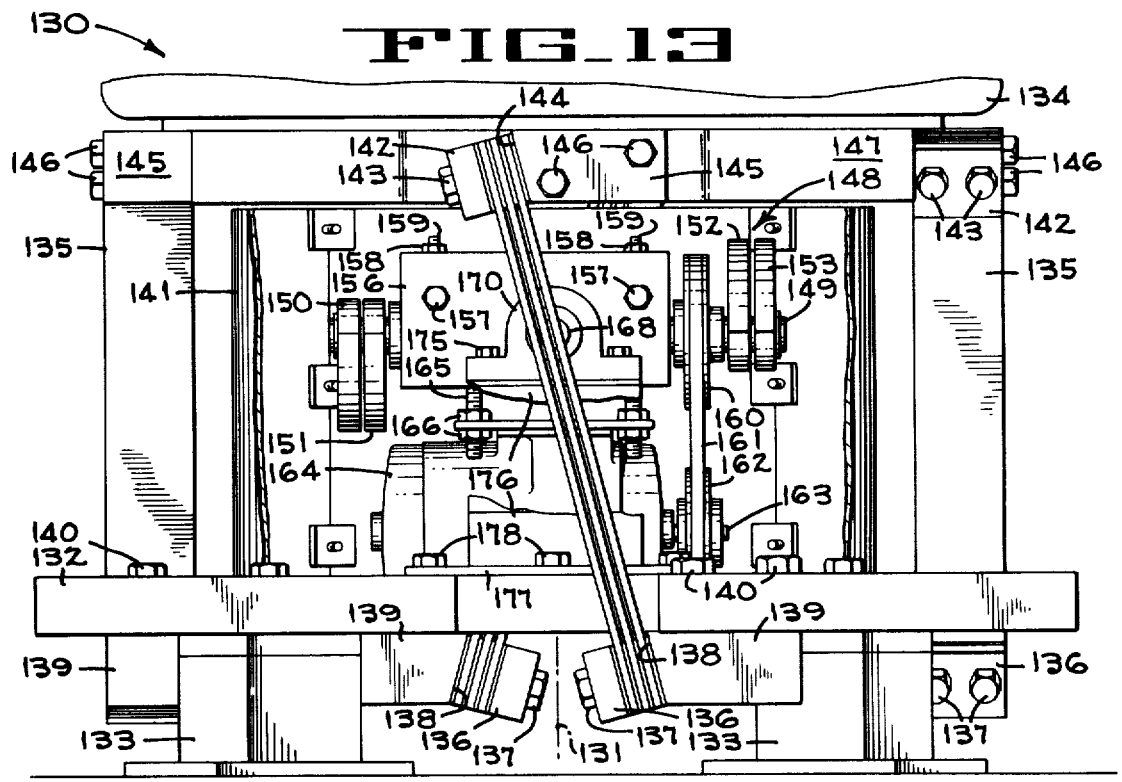
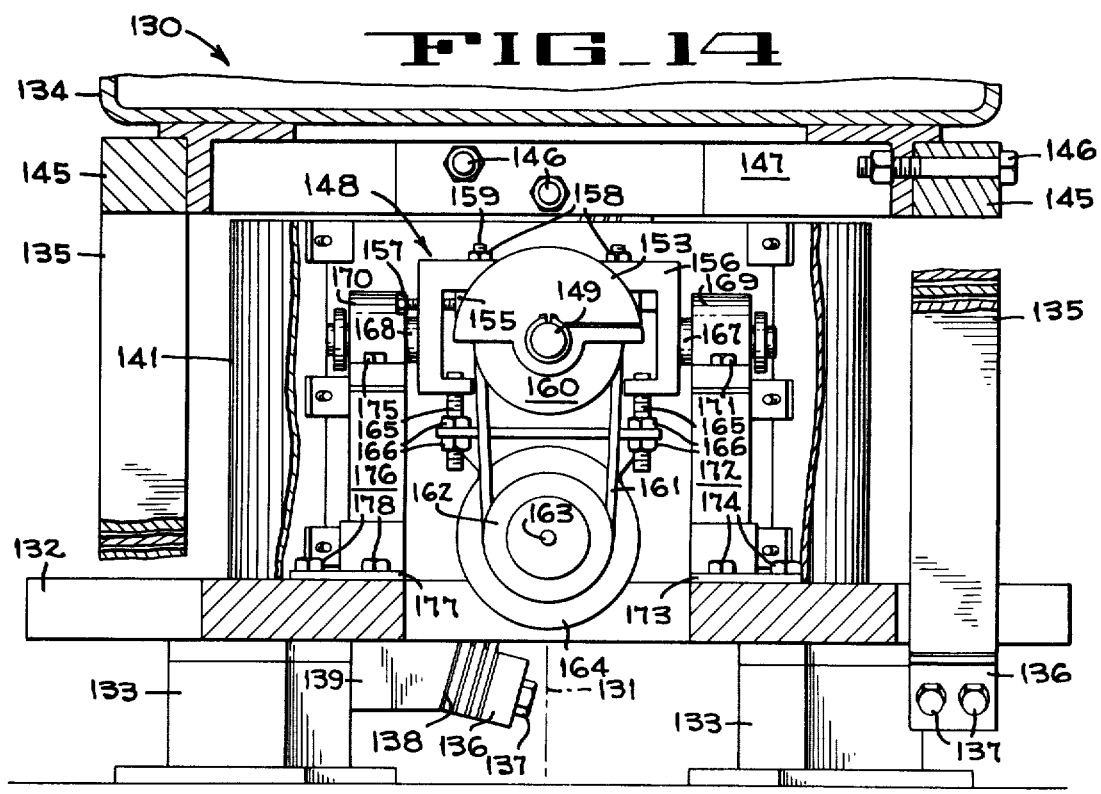

VIBRATORY PARTS FEEDER DRIVEN BY ROTATING ECCENTRIC WEIGHTS

BACKGROUND OF THE INVENTION

1. Field of the Invention

This invention relates to a vibratory parts feeder with a driver that includes a plurality of rotating eccentric weights.

2. Description of the Prior Art

A typical vibratory parts feeder is shown in U.S. Pat. No. 3,258,111. Such feeders include a base mass that is supported upon vibration isolators and a frame mass that is mounted above the base mass by at least three inclined leaf spring sets which enable rotational oscillatory movement of the frame mass in response to an exciter motor. Such exciter motors are commonly of an electromagnetic type that includes a field core and a coil mounted on the base mass. An armature is mounted on the underside of the frame mass with an air gap between opposing faces of the field core legs and the armature. When an alternating current is supplied to the coil, the armature and frame mass are alternately drawn toward the coil and released flexing the leaf spring sets. Thus, the frame mass oscillates about a central vertical axis at a predetermined frequency that is established by the frequency of the current supplied to the coil.

A problem encountered with such feeders is that they are difficult to make in large sizes because the air gap of the electromagnet is limited by the magnetic force available and thus, the gap must be relatively small. A small air gap necessitates a short stroke and a high frequency. Since high frequency operation can cause high stresses in the feeder structure, a massive structural design is needed for the feeder structure to be compatible with high frequency stresses.

U.S. Pat. No. 3,159,269 shows a driving arrangement for a material handling device. Reciprocating vertical force impulses that are generated by an air operated vibrator are applied through a mechanical linkage that includes a lever arm, to the underside of a feeder bowl. While this force transmitting linkage is not limited by an air gap, it does depend upon mechanical impact between components to create the vibration and such mechanical impact causes noise and wear of components.

U.S. Pat. No. 2,418,982 shows a rocking mixer that has a resiliently supported base member and a material container resiliently supported above the base member. A plurality of rotating eccentric weights are journalled in the base member to provide the vibratory driving force that produces either a rocking motion or a vertical translatory motion of the material container. While this driving arrangement eliminates mechanical impact between components, the rocking motion or vertical translatory motion produced would not be satisfactory for a feeder bowl that requires simultaneous rotational oscillation and vertical reciprocation.

SUMMARY OF THE INVENTION

An object of the present invention is to provide a vibratory parts feeder that can be made in large sizes and can operate at a lower frequency with a longer stroke than corresponding feeders with electromagnetic exciter motors.

Another object of the present invention is to provide a vibratory parts feeder that operates quietly with minimal component wear and without mechanical impact to create the vibration.

A further object of the present invention is to provide simultaneous rotational oscillations and vertical reciprocations of a feeder bowl in a vibratory parts feeder by a driver that includes a plurality of rotating eccentric weights.

In accordance with the present invention, a vibratory parts feeder with a central vertical axis has a feeder bowl mass that is supported above a base mass by a plurality of inclined leaf springs. Each leaf spring has one end connected to the base mass and the opposite end connected to the feeder bowl mass. The leaf springs are arranged to move one of the masses vertically in relationship to the other mass in response to rotational twisting of one of the masses relative to the other mass about the central vertical axis of the feeder. A driver that is mounted on one of the masses has a plurality of rotating eccentric weights to impart to the mass upon which the driver is mounted, oscillating rotational impulses about the central vertical axis of the feeder.

BRIEF DESCRIPTION OF THE DRAWING

FIG. 1 is a perspective view of a vibratory parts feeder embodying the present invention with portions of the feeder being broken away to shown underlying structure.

FIG. 2 is a partial section taken on the line 2—2 of FIG. 1.

FIG. 3 is a perspective view of a base and driver portion of a vibratory parts feeder embodying a second form of the invention.

FIG. 4 is a perspective view of a base and a driver portion of a vibratory parts feeder embodying a third form of the invention.

FIG. 5 is a partial section taken on the line 5—5 of FIG. 4.

FIG. 6 is a partial section somewhat like FIG. 5 but illustrating a fourth embodiment of the invention.

FIG. 7 is a section taken on the line 7—7 of FIG. 6.

FIG. 8 is a partial section somewhat like FIG. 5 but illustrating a fifth embodiment of the invention.

FIG. 9 is a perspective view of the flexible steel bushing shown in FIG. 8.

FIG. 10 is a plan view of a base and driver portion of a vibratory parts feeder embodying a sixth form of the invention.

FIG. 11 is an elevation with parts broken away of the feeder shown in FIG. 10.

FIG. 12 is a plan view with parts broken away of a vibratory parts feeder embodying a seventh form of the invention.

FIG. 13 is a front view with parts broken away of the feeder shown in FIG. 12.

FIG. 14 is a right side view with portions broken away of the feeder shown in FIG. 12.

DESCRIPTION OF THE PREFERRED EMBODIMENTS

Looking now at FIG. 1, a vibratory parts feeder 20 with a central vertical axis 21 has a feeder bowl 22. A helical track 23 originates at the bottom of the bowl and extends upwardly along the inner periphery of the bowl wall to an exit station 24 that is located at the top of bowl. A discharge chute 25 slopes downwardly from the exit station and outwardly from the bowl. Articles, such as machine parts, can be dumped in the bowl and fed progressively in single file from the bowl's lower portion, along the helical track, to the discharge chute. Four leaf spring assemblies 26 support the bowl above a base 27 and guide the bowl during vibration for feeding articles. The base is supported upon vibration isolators 28 and a driver 29 is mounted upon the base, to impart to the base, oscillating rotational impulses about the central vertical axis of the feeder.

The driver 29 has an electric motor 30 with a double ended drive shaft 31 upon which a pair of adjustable eccentric weights 32 are located at one end of the shaft and an equivalent pair of weights 33 are located at the opposite end of the shaft. The weights 32 are arranged on the shaft in an out of phase relationship with the weights 33 so that forces developed upon rotation of the shaft will be acting in different directions radially of the shaft. Preferably, the weights will be arranged on the shaft with the eccentricities of the weights 32 and 33 projecting in diametrically opposite directions relative to the shaft. Upon rotation of the shaft, centrifugal force develops upon the shaft a force couple that tends to cause gyration of the shaft and motor about their center.

There are a pair of weights 32 and a pair of weights 33. These weights can be adjusted to obtain a desired force by rotating a weight at one end of the shaft 31 relative to the other weight at the same end of the shaft. When the eccentricities of both weights are aligned in the same radial direction, the greatest force is obtained and as the arcuate angle of separation is increased, the force is reduced. At 180°, the eccentricities would be opposed to each other and the force developed by one weight would counterbalance the force developed by the other weight so that there would be no effective centrifugal force resulting from rotation of the weights.

The base 27 has a generally square shape and is supported at each of its corners by vibration isolators 28. An octagonal opening 35 is provided in the central portion of the base and a support channel 36 is suspended within the opening by directional constraints 37 and 38. These constraints are formed by horizontal leaf springs that have one end clamped between plates 39 and 40 and fastened by cap screws 41 to the base. The opposite ends of the leaf springs are fastened to the support channel by a clamp plate 42 and cap screws 43. The electric motor 30 is mounted on the support channel with the midpoint of the shaft 31 centered between the directional constraints 37 and 39.

Upon rotation of the drive shaft 31, each end of the motor 30 tends to gyrate about the center of the motor, which appears to remain stationary while viewing from either end of the shaft. The directional constraints 37 and 38 constrain rotational motion of the driver 29 about the central vertical axis 21 but transmit forces acting in a horizontal plane from the driver 29 to the base 27. Preferably, the horizontal plane of constraint is in the same plane as the center line of the drive shaft when in an at rest position. The directional constraints can bend and twist vertically and allow the motor to gyrate but transfer very little vertical force. Forces acting vertically upon the shaft tend to cancel out at the directional constraints since the forces at each end of the shaft are equal but acting in opposite directions. Thus, the constraints act as isolators of forces in a vertical plane. Horizontal forces transmitted through the directional constraints to the base provide oscillating rotational impulses acting in a horizontal plane. The base can vibrate unconstrained since it is supported upon vibration isolators 28.

A block 45 is fastened to each corner of the base 27 by cap screws 46. Each block has one side that defines an inclined seat 47 to which an inclined leaf spring assembly 26 is mounted. Each assembly (illustrated with two leaf springs) is clamped at one end to the seat by a clamp plate 48. A pair of cap screws 49 extend through the clamp plate and leaf spring assembly and are threadedly received in the seat. The opposite end of the leaf spring assembly is attached to a mounting frame, not shown, that supports the feeder bowl 22.

The oscillating rotational forces acting upon the base are transmitted through the leaf spring assemblies 26 to the feeder bowl 22. The leaf spring assemblies are inclined uniformly in one direction about the central vertical axis 21. Rotation of the base 27 about the axis relative to the feeder bowl 22 in the direction of upwardly slope of the leaf spring assemblies causes the leaf springs to guide the feeder bowl vertically upward. Rotation of the base above the axis relative to the feeder bowl in the direction of downward slope of the leaf spring assemblies causes the leaf spring assemblies to guide the feeder bowl vertically downward. The angle of the leaf spring assemblies relative to the vertical defines the resulting angle of vibration on the feeder bowl.

The stiffness or spring rate of the leaf spring assemblies 26 is selected to provide a natural frequency of vibration to be within 10 percent of the normal slip speed of the electric motor 30. Preferably, the natural frequency of vibrations is 10 percent over the normal slip speed of the motor. By selecting the natural frequency very near the operating frequency, the system has the advantage of a near resonant condition that provides high vibrational amplitudes with a small force input. Such tuning minimizes the force required and permits control of amplitude by a small change in frequency. The speed of the electric motor can be controlled by the voltage supplied thereto and from this control of the frequency, a desired vibrational amplitude can be obtained.

Vibration of the leaf spring assemblies 26 causes the feeder bowl 22 to oscillate rotationally about the central vertical axis 21 and to reciprocate vertically. Articles within the feeder bowl move outwardly to the helical track 23 and upwardly along the track in response to the vibration. The helical track can lose contact on a downstroke with articles fed therealong and when contact is resumed on an upstroke, the articles are in advanced positions along the track due to rotation of the feeder bowl on the downstroke. Rotation of the feeder bowl on the upstroke causes the articles to move upward with the helical track.

FIG. 3 illustrates a second embodiment of the invention. A vibratory parts feeder 50 with a central vertical axis 51 has a base 52 that is supported upon vibration isolators 53. A feeder bowl, not shown, is supported above the base by four leaf spring assemblies 54 in a manner similar to that previously described for the feeder bowl 22 and the leaf spring assemblies 26. A driver 55 is mounted upon the base to impart to the base oscillating rotation impulses about the axis 51.

The driver 55 has an electric motor 56 with a double ended drive shaft 57. An eccentric weight 58 is located at one end of the shaft and a similar eccentric weight 59 is located at the opposite end of the shaft. The weight 58 is positioned on the shaft with its eccentricity projecting in the opposite radial direction relative to the shaft from the eccentricity of the weight 59 so that forces developed upon rotation of the shaft will be acting in diametrically opposite directions and thereby develop a force couple upon the shaft. A pair of trunnions 61 and 62 having a rectangular cross-section project laterally from the electric motor 56. These trunnions are centered upon a transverse axis 63 that is perpendicular to the drive shaft 57 and to the vertical axis 51.

The driver 55 is mounted on the base 52 in a manner to impart to the base only oscillating rotational impulses about the central vertical axis 51. Elastomers 64 and 65 are bonded by any appropriate bonding technique to opposite vertical sides of the trunnion 61 and to abutments 66 and 67 that are fastened to the base. Similarly, elastomers 68 and 69 are bonded to opposite vertical sides of the trunnion 62 and to abutments 70 and 71. These elastomers provide stiff resistance in compression horizontally between the trunnions and the abutments but will readily bend in vertical shear and in torsion. Thus, the elastomers act as directional constraints that constrain oscillation of the driver about the central vertical axis and transmit forces acting in a horizontal plane from the driver trunnions to the abutments. The elastomers can bend and twist vertically and allow the driver to gyrate freely about the transverse axis 63. Forces acting vertically upon the elastomers tend to be cancelled. The elastomers transfer only a small amount of vertical force and act as isolators of forces in a vertical plane. Forces transmitted through the elastomers and abutments to the base provide a torsional vibration acting in a horizontal plane about the axis 51.

The leaf spring assemblies 54 are mounted to the base 52 in the same manner as described for the previous embodiment. Operation of the vibratory parts feeder 51 is similar to the operation previously described for the feeder 20.

FIG. 4 illustrates a third embodiment of the invention that is similar in many ways to the embodiments previously described. To simplify the description, only those portions that are different will be described in detail. A vibratory parts feeder 73 with a central vertical axis 74 has a driver 75 that is supported on a transverse horizontal axis 76 by a pair of cylindrical trunnions 77 and 78. These cylindrical trunnions are journalled within rotatable bearing assemblies 79 and 80. As shown in FIG. 5, assembly 79 has an inner race 79a, an outer race 79b, and a set of ball bearings 79c. Assembly 80 has an inner race 80a, an outer race 80b and a set of ball bearings 80c. The bearing assembly 79 is supported by a pillow block 81 and held in place on the pillow block by a retainer cap 82. Bearing assembly 80 is supported by a pillow block 83 and held in thereon by a retainer cap 84.

The rotatable bearing assemblies 79 and 80 permit free rotation of the driver 75 about the transverse horizontal axis 76 but constrain oscillation of the driver about the central vertical axis 74. Since the driver eccentric weights are 180° out of phase and spaced equal distance from the axis 76, the vertical forces tend to cancel out. The rotatable bearing assemblies transmit little force torsionally since they allow rotation about the axis 76 but give nearly 100% transmission of forces about the axis 74. Thus, torsional vibrations acting in a horizontal plane about the axis 74 are transmitted from the trunnions 77 and 78 through the rotatable bearing assemblies to the pillow blocks 81 and 83.

FIGS. 6 and 7 illustrate a fourth embodiment of the invention that differs from the third embodiment previously described by substituting, for the rotatable bearing assemblies 79 and 80, a pair of rotary rubber bushing assemblies 89 and 90. As shown more clearly in FIG. 7, the rotary rubber bushing assembly 90 includes a thin metal inner sleeve 91 that fits about a trunnion 88. A rubber sleeve 92 fits over the inner sleeve, and an outer sleeve 93 made of metal fits over the rubber sleeve. These bushing assemblies provide torsional freedom for rotation of the trunnions and restraint radially of the trunnions for transferring forces.

A fifth embodiment of the invention is illustrated in FIGS. 8 and 9. This embodiment differs from the fourth embodiment previously described in that flexural pivots 95 and 96 are used to serve the purpose of trunnions and flexible bushing assemblies. As shown in FIG. 9, the flexural pivots include a pair of sleeves 97 and 98 that are joined together by a cross-shaped spring 99. The spring is fixed within the sleeves and one sleeve can rotate relative to the other sleeve due to torsional flexure of the spring. "Free Flex" flexural pivots are manufactured by The Bendix Corporation, Fluid Power Division, 211 Seward Avenue, Utica, New York 13503. The flexural pivots provide for isolation of torsional stress while transferring forces acting in a horizontal plane radially of the sleeves.

With reference to FIGS. 10 and 11, a sixth embodiment of the invention is shown. A vibratory parts feeder 100 with a central vertical axis 101 has a base 102 that is supported upon vibration isolators 103. A feeder bowl, not shown, is supported above the base by four leaf spring assemblies 104 in a manner similar to that previously described for the feeder bowl 22 and the leaf spring assemblies 26. A driver 105 is mounted upon the base to impart to the base oscillating rotational impulses about the axis 101.

The driver 105 has a housing 107 that is mounted at one corner of the base 102. Extending vertically through a top portion of the housing is a shaft 108 that is mounted for rotation therein. A pair of eccentric weights 109 and 110 are mounted on the shaft portion that is located within the housing and a pulley wheel 111 is mounted on the shaft portion projecting upward from the top portion of the housing. Also mounted on the base is a housing 112 that is located at a corner of the base opposite from the housing 107. Extending vertically through a top portion of the housing 112 and mounted for rotation therein is a shaft 113. A pair of eccentric weights 114 and 115 are mounted on the shaft portion that is located within the housing 112 and a pair of pulley wheels 116 and 117 are mounted on the portion of the shaft 113 projecting upward from the top portion of the housing.

The shafts 108 and 113 are mounted symmetrically about the central vertical axis 101. A drive belt 118 is trained about the pulleys 111 and 117 so that the shafts rotate simultaneously at the same speed. An electric motor 119 that is mounted on the base 102 has a vertical drive shaft 120 with a pulley 121 mounted thereon. A drive belt 122 is trained about pulleys 116 and 121 to drive the shaft 113. The eccentric weights 109 and 110 are mounted in an out of phase relationship with the eccentric weights 114 and 115 so that a force couple acting in a horizontal plane is generated about the central vertical axis 101 upon rotation of the shafts.

Horizontally acting forces are developed by rotation of the eccentric weights with the vertical shafts. These forces are transmitted through the housing 107 and 112 to the base 102 where they provide oscillating rotational impulses acting in a horizontal plane about the axis 101. The leaf spring assemblies 104 transmit vibration to the feeder bowl in the same manner as that described for the previous embodiments and the feeding of parts from within the feeder bowl is also the same.

A seventh embodiment of the invention is shown in FIGS. 12, 13 and 14. In this form, a vibratory parts feeder 130 with a central vertical axis 131 has a base 132 that is supported upon vibration isolators 133. A feeder bowl 134 is supported above the base by four leaf spring assemblies 135. Each leaf spring assembly (illustrated with three leaf springs) is clamped at its lower end by a plate 136 and by cap screws 137 to a seat 138 of a block 139. The block is fastened to the underside of the base by cap screws 140 that extend through the base. The upper end of the leaf spring assembly is clamped by a plate 142 and by cap screws 143 to a seat 144 of a block 145. The block is fastened by cap screws 146 to a mounting frame 147 upon which the feeder bowl 134 is mounted. A driver 148 is mounted upon the base to impart thereto oscillating rotational impulses about the axis 131.

The driver 148 is enclosed laterally within a cylindrical shell 141 that is mounted on the base. The driver has a substantially horizontal shaft 149 with a pair of eccentric weights 150 and 151 mounted at one end of the shaft and a pair of eccentric weights 152 and 153 mounted at the opposite end of the shaft. Each pair of weights can be adjusted to obtain a desired force by rotating one weight relative to the other weight at the same end of the shaft. The weights 150 and 151 are arranged on the shaft in an out of phase relationship with the weights 152 and 153 so that forces developed at opposite ends of the shaft upon rotation thereof will be acting in diametrically opposite directions relatively to the shaft. Thus, a force couple is developed upon the shaft. These forces tend to cause the shaft to gyrate about the shaft mid-point which corresponds to the intersection of the shaft with the axis 131.

The shaft 149 is mounted for rotation within bearing blocks 155 (FIG. 14) that are supported by a mounting bracket 156. The bearing blocks can be adjustably positioned in a horizontal direction within the mounting bracket by a pair of cap screws 157 that extend through one end of the mounting bracket. The bearing blocks can be positioned in a vertical direction by adjusting each nut 158 on each bolt 159 that extends vertically through the mounting bracket. A driven pulley 160 is mounted on the shaft for rotating the shaft. A drive belt 161 is trained about the driven pulley and a drive pulley 162. This drive pulley is mounted on a drive shaft 163 of an electric motor 164. The mounting bracket and the electric motor are coupled together by four bolts 165, each bolt having a pair of nuts 166 threadably fitted thereon for adjusting and locking the motor at a desired elevation.

The mounting bracket 156 has a pair of laterally projecting trunnions 167 and 168 that are aligned opposite the axis 131. The trunnions 167 and 168 are journalled in pillow blocks 169 and 170, respectively. The pillow block 169 is attached by cap screws 171 to the top of a column 172 that projects upward from a pedestal 173. Cap screws 174 fasten the pedestal to the base 132. Cap screws 175 fasten the pillow block 170 to the top of a column 176 that projects upward from a pedestal 177. Cap screws 178 fasten the pedestal 177 to the base. The pillow blocks permit rotation of the trunnions therein but constrain rotation of the mounting bracket and driver shaft 149 about the central vertical axis 131. Thus, oscillating rotational impulses acting in a horizontal plane about the axis 131 are transmitted from the trunnions, through the pillow blocks, through the columns, and througn the pedestals, to the base 132.

The leaf spring assemblies 135 transmit vibration from the base to the feeder bowl 134 in a manner similar to that of previously described embodiments. The feeding of parts from within the feeder bowl due to vibration is also similar to that previously described.

Although the best mode contemplated for carrying out the present invention has been herein shown and described, it will be apparent that modification and variation may be made without departing from what is regarded to be the subject matter of the invention.

What is claimed is:

1. A vibratory parts feeder with a central vertical axis comprising a base mass being supported upon vibration isolators, a feeder bowl mass being supported above the base mass, a plurality of inclined leaf springs having one end of each spring connected to the base mass and the opposite end of each spring connected to the feeder bowl mass for supporting and guiding the feeder bowl mass above the base mass, said leaf springs being arranged to move one of the masses vertically in response to rotational twisting of one of the masses relative to the other mass about the central vertical axis, a driver being mounted on one of the masses and having a substantially horizontal shaft with a plurality of eccentric weights mounted at the end portions of the shaft for rotation therewith, a plurality of directional constraints supporting said driver for transmitting to the mass upon which the driver is mounted horizontally acting forces and isolating from that mass vertical acting forces to impart to that mass oscillating rotational impulses about the central vertical axis of the feeder.

2. A vibratory parts feeder as described in claim 1 wherein the weight at one end of the shaft is equal to the weight at the opposite end of the shaft, said eccentric weights being arranged on the drive shaft with the eccentricity at one end projecting in an opposite direction radially of the shaft from the eccentricity at the other end, said directional constraints being located at opposite sides of the driver and on a lateral horizontal axis that intersects the central vertical axis of the feeder, said directional constraints enabling rotation of the driver about the lateral horizontal axis and restraining rotation of the driver about the central vertical axis.

3. A vibratory parts feeder as described in claim 2 wherein said directional constraints include horizontal leaf springs.

4. A vibratory parts feeder as described in claim 2 wherein said directional constraints include elastomers.

5. A vibratory parts feeder as described in claim 2 wherein said directional constraints include cylindrical trunnions that are journalled within rotatable bearing assemblies.

6. A vibratory parts feeder as described in claim 2 wherein said directional constraints include rotary rubber bushing assemblies.

7. A vibratory parts feeder as described in claim 2 wherein said directional constraints include flexural pivots.

8. A vibratory parts feeder as described in claim 1 which further includes a drive motor being separate from the driver shaft, a drive operably connecting the drive motor with the driver shaft, and a mounting supporting both the drive motor and the driver shaft, said mounting being supported by the directional constraints.

9. A vibratory parts feeder as described in claim 8 wherein the directional constraints transmit forces in a horizontal plane that corresponds to a horizontal plane through the longitudinal axis of the driver shaft in an at rest position.

10. A vibratory parts feeder as described in claim 8 wherein said directional constraints are located at opposite sides of the driver and on a lateral horizontal axis that intersects the central vertical axis of the feeder, said directional constraints enabling rotation of the driver about the lateral horizontal axis and restraining rotation of the driver about the central vertical axis.

11. A vibratory parts feeder as described in claim 10 wherein the weight at one end of the shaft is equal to the weight at the opposite end of the shaft, said eccentric weights being arranged on the driver shaft with the eccentricity at one shaft end projecting in an opposite direction radially of the shaft from the eccentricity at the other shaft end.

* * * * *